(12) United States Patent
Shivji et al.

(10) Patent No.: US 12,316,815 B2
(45) Date of Patent: May 27, 2025

(54) SYNCHRONIZING MULTIPLE PRINTING PRESSES

(71) Applicant: Hewlett-Packard Development Company, L.P., Spring, TX (US)

(72) Inventors: Shane Shivji, Corvallis, OR (US); Thomas J. Peck, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 265 days.

(21) Appl. No.: 17/415,254

(22) PCT Filed: Jul. 26, 2019

(86) PCT No.: PCT/US2019/043649
§ 371 (c)(1),
(2) Date: Jun. 17, 2021

(87) PCT Pub. No.: WO2021/021078
PCT Pub. Date: Feb. 4, 2021

(65) Prior Publication Data
US 2022/0143990 A1    May 12, 2022

(51) Int. Cl.
*H04N 1/00*    (2006.01)

(52) U.S. Cl.
CPC ..... *H04N 1/00933* (2013.01); *H04N 1/00347* (2013.01); *H04N 2201/0031* (2013.01); *H04N 2201/0032* (2013.01)

(58) Field of Classification Search
CPC ........... H04N 1/00933; H04N 1/00347; H04N 2201/0031; H04N 2201/0032; B41J 15/18; B41J 11/008; B41J 15/22
See application file for complete search history.

(56) References Cited

U.S. PATENT DOCUMENTS

| | | | |
|---|---|---|---|
| 4,955,265 A | 9/1990 | Nakagawa et al. | |
| 5,548,390 A | 8/1996 | Sugisaki et al. | |
| 5,894,802 A | 4/1999 | Jackson | |
| 6,343,549 B1 | 2/2002 | Tokiwa | |
| 7,010,359 B2 | 3/2006 | Faulhammer et al. | |
| 7,566,123 B2 | 7/2009 | Silverbrook | |
| 8,355,159 B2 * | 1/2013 | Dobbertin | G03G 15/5008 358/1.6 |

(Continued)

FOREIGN PATENT DOCUMENTS

| | | |
|---|---|---|
| CH | 704936 B1 | 11/2012 |
| EP | 0852538 B1 | 5/1999 |

(Continued)

*Primary Examiner* — John R Wallace
(74) *Attorney, Agent, or Firm* — Jordan IP Law, LLC

(57) ABSTRACT

In various examples, a master press and a slave press may be synchronized. A signal associated with the master press printing a first frame on a first web may be received. A point in time may be determined at which the slave press should begin printing, on a second web, a second frame corresponding to the first frame. The determining may be based on the signal associated with the master press and a first distance between the slave press and a downstream location at which the first and second webs converge. The slave press may be operated to begin printing the second frame at the point in time.

10 Claims, 7 Drawing Sheets

(56) References Cited

U.S. PATENT DOCUMENTS

| | | | |
|---|---|---|---|
| 9,022,512 B2* | 5/2015 | Schnabel | B41J 11/42 347/101 |
| 10,016,979 B1* | 7/2018 | Landau | G03G 15/50 |
| 2009/0003916 A1 | 1/2009 | Lemoine | |
| 2009/0020027 A1 | 1/2009 | Numauchi | |
| 2009/0177306 A1 | 7/2009 | Bosga et al. | |
| 2009/0243204 A1* | 10/2009 | Breunig | B41F 33/06 271/264 |
| 2014/0184710 A1* | 7/2014 | Hacker | B41J 11/00214 347/102 |
| 2015/0049135 A1* | 2/2015 | Ohman | B41J 3/543 347/9 |
| 2018/0345619 A1* | 12/2018 | Lang | B65H 23/18 |

FOREIGN PATENT DOCUMENTS

| | | |
|---|---|---|
| EP | 2422990 A1 | 2/2012 |
| JP | 2004001404 A | 1/2004 |
| JP | 5765987 B2 | 8/2015 |

\* cited by examiner

SYNCHRONIZING MULTIPLE PRINTING PRESSES

BACKGROUND

Offset printing often involves printing fixed content onto rolls, or continuous "webs," of print media such as paper or cardboard. This may be accomplished, for instance, using a printing press equipped with plates customized to print the fixed content. In some cases, multiple printed webs are combined for further processing, or "finishing," which can include, for instance, folding, cutting, assembling, gluing, collating, etc. Digital printing presses enable "variable" content to be printed onto different portions of a web. For example, content directed to a first person may be printed as a first frame onto a first portion of the web, content directed to a second person may be printed as a second frame onto a second portion of the web, and so forth.

BRIEF DESCRIPTION OF THE DRAWINGS

Features of the present disclosure are illustrated by way of example and not limited in the following figure(s), in which like numerals indicate like elements.

DETAILED DESCRIPTION

Figure 1:
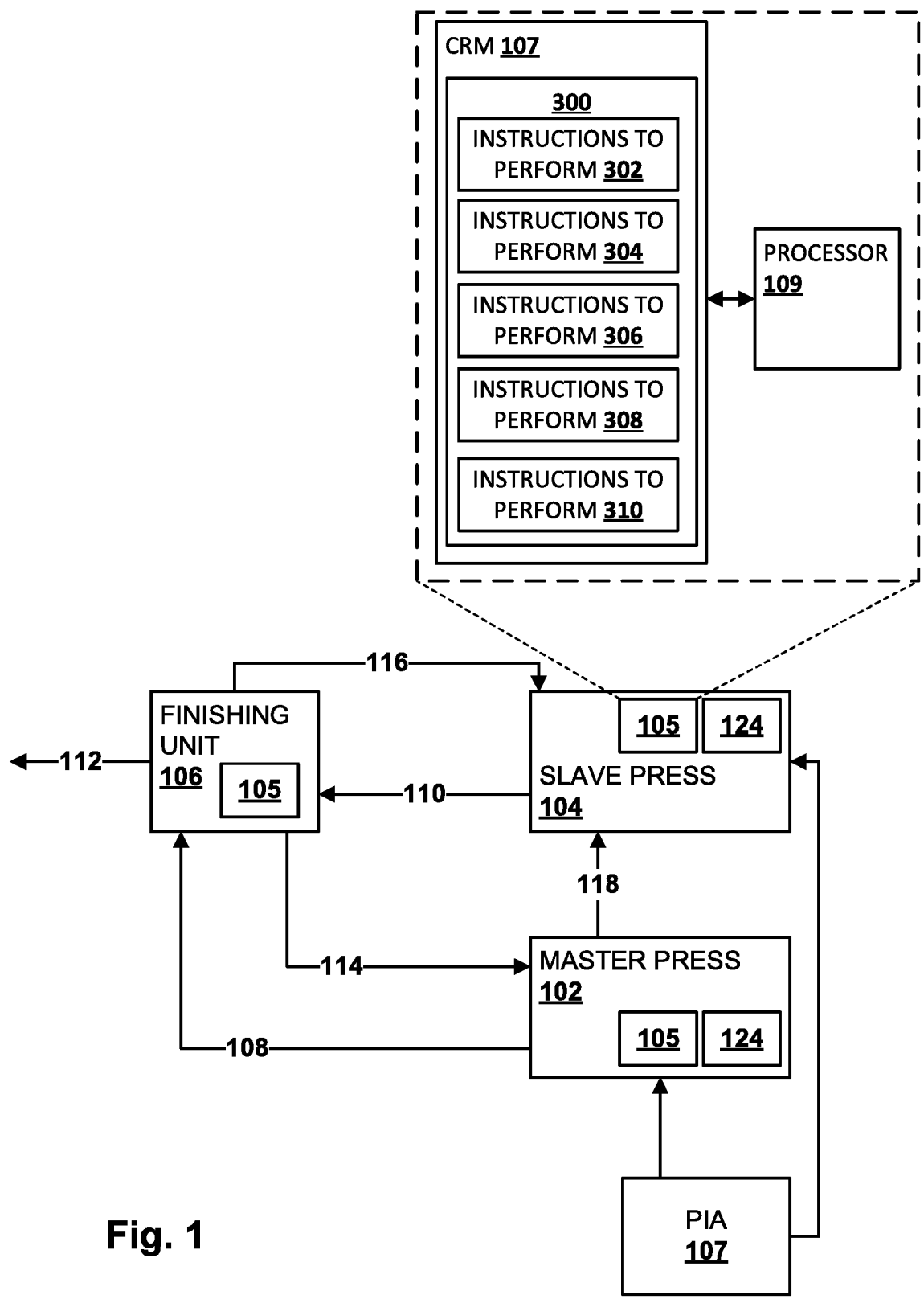
FIG. 1 is a drawing of an example environment in which selected aspects of the present disclosure may be implemented.

For simplicity and illustrative purposes, the present disclosure is described by referring mainly to examples thereof. In the following description, numerous specific details are set forth in order to provide a thorough understanding of the present disclosure. The present disclosure may be practiced without limitation to these specific details. In other instances, some methods and structures have not been described in detail so as not to unnecessarily obscure the present disclosure.

The elements depicted in the accompanying figures may include additional components and that some of the components described in those figures may be removed and/or modified without departing from the scope of the elements disclosed herein. It should also be understood that the elements depicted in the figures may not be drawn to scale and thus, the elements may have different sizes and/or configurations other than as shown in the figures.

Printing variable content onto multiple webs that are intended for combination into target products raises various challenges. Each digital printing press may be a different distance from a "web convergence location," which may be a downstream location at which webs from multiple presses converge, e.g., for finishing. Moreover, each printing press may be equipped with its own positional (e.g., rotary) encoder that provides a signal indicating, for instance, a length of web that has been fed through the printing press at a given moment of time, and/or velocity at which the web is fed through the printing press. These paper encoders may not necessarily be perfectly calibrated. For example, even if two webs are fed through two digital presses at the same velocity, respective paper encoders of the two digital presses may read the respective velocities slightly differently. Consequently, there may be spatial divergence between frames of the respective digital presses. This divergence can result in respective frames targeting a single person being offset from each other upon arrival at a finishing unit.

Even if webs are fed through multiple presses at the same velocity, respective encoders of the multiple presses may perceive their local web velocities to be slightly different. For example, a printing press feeding a web at 400 feet per minute (fpm) may be equipped with a paper encoder that perceives the web-feed velocity as, for instance, 399.85 fpm or 400.94 fpm. In either case, a small amount of error is introduced to each frame. If left unchecked, this error will accumulate over time. Some digital presses even control frame sizes based on encoder output. If an encoder misleads such a digital press about the rate at which web is being passed through, the press may digitally compensate the size of frames, e.g., by expanding or shrinking the content in the frames.

Accordingly, examples are described herein for synchronizing multiple printing presses to ensure that corresponding content frames printed on respective webs arrive at a downstream web convergence location, such as a finishing unit, at the same time. For example, various techniques are provided for operating one printing press, which may be referred to herein as a "slave" printing press, to begin printing a frame at a point in time that is determined based on another point in time at which another printing press, which may be referred to herein as a "master" printing press, begins printing a related frame. And, with techniques described herein, even if paper encoders across multiple presses are out of synch, the errors they generate will effectively be "reset" at each frame. Thus, those errors will not grow over time.

In some examples, respective distances between the master and slave printing presses and the downstream web convergence location may be considered. For example, a difference between the respective distances may be used in combination with a paper encoder signal of the slave printing press to determine when the slave printing press should be operated to begin printing a frame. Suppose the slave printing press is farther away from a finishing unit than the master printing press, and that the master and slave presses feed their respective webs at the same velocity. In some examples, the slave printing press may begin to print its corresponding frame somewhat earlier than the master printing press, e.g., so that the respective frames arrive at the web convergence location at the same time.

In some examples, a computer-implemented method for synchronizing a master press and a slave press may include: receiving a signal associated with the master press printing a first frame on a first web; determining a point in time at which the slave press should begin printing, on a second web, a second frame corresponding to the first frame, wherein the determining is based on the signal associated with the master press and a first distance between the slave press and a downstream location at which the first and second webs converge; and operating the slave press to begin printing the second frame at the point in time.

In various examples, the determining is based on a second distance between the master press and the downstream location. In various examples, the determining is based on a difference between the first distance and the second distance. In various examples, the downstream location comprises a finishing unit, and the method further includes operating the finishing unit to combine a portion of the first web that contains the first frame and a portion of the second web that contains the second frame into a combined product.

In various examples, the first frame is different than other frames printed on the first web by the master press. In various examples, the second frame is different than other frames printed on the second web by the slave press. In various example, the point in time comprises a first point in time, the signal identifies a second point in time in which the master press begins printing the first frame on the first web, and the determining is based on the second point in time. In various examples, the method further includes altering a velocity at which the second web is fed through the slave press based on the signal.

In another related aspect, a system for synchronizing printing between first and second printing presses may: obtain a first distance between the first printing press and a downstream finishing unit; obtain a second distance between the second printing press and the downstream finishing unit; and determine a point in time at which the second printing press is to begin printing content on a continuous print medium. The point in time may be determined based on paper encoder signal generated by a paper encoder of the second printing press and a difference between the first and second distances.

In another related aspect, a printing press may: receive a signal from a remote printing press, wherein the signal indicates a first moment in time at which the remote printing press begins printing a first frame on a first web; determine a second moment in time at which the printing press will begin printing, on a second web, a second frame intended for combination with the first frame in a product, wherein the determination is based on the first moment in time and a distance between the remote press and a finishing unit at which the first and second webs converge; and operate the printing press to begin printing the second frame at the second moment in time. In various examples, the determination is based on a difference between the distance and another distance between the printing press and the finishing unit.

Referring now to FIG. 1, a plurality of printing presses, or simply "presses," may include a first "master" press 102 and a second "slave" press 104. As will become clear from the present disclosure, master press 102 is so-named because in various examples, operation of slave press 104 is keyed off of, i.e. dependent on, attribute(s) of operation of master press 102. Likewise, slave press 104 is so-named because in various examples, operation of slave press 104 is dependent on attribute(s) of operation of master press 102. Presses 102, 104 may alternatively be referred to as first and second printing presses. Additionally, from the perspective of one press, such as master press 102, the other press(es) may be referred to as a "remote press."

Master press 102 and slave press 104 are to print content such as images, text, etc., onto respective webs 108 and 110. As used herein, a "web" refers to a continuous print medium that is may be stored, for instance, in a large roll, e.g., as a reel of paper, cardboard, or other suitable material, and that is fed through a printing press such as master press 102 and/or slave press 104 so that the printing press can print content onto the web.

Master press 102 and/or slave press 104 may take various forms, such as "analog" offset printing presses, "digital" printing presses, etc. As used herein, an "analog" printing press refers to a press that prints static content onto a web. An analog printing press may include roller(s) or drum(s) on which plate(s) may be mounted. Prior to mounting, these plates may be processed using various techniques, such as photolithography, to include content-to-be-printed. Consequently, content printed by an analog printing press is static until these plates are replaced with plates having different content. The resulting web may include a sequence of uniform images, each contained in what will be referred to herein as a "frame." Because the images printed by an analog printing are uniform, the frames are also uniform in longitudinal length (i.e. the direction of printing, a.k.a., "down-web" or "in machine direction").

By contrast, a digital printing press may be operated to print any number of different images onto a single web, e.g., in any order or sequence. Accordingly, digital printing presses may be operated to print customized content such that the resulting web has any number of different images in any order. In some cases, those different images may have different longitudinal lengths in the direction of printing. Consequently, frames printed by a digital printing press may vary in size down-web.

Master press 102 and slave press 104 are located upstream of a finishing unit 106. As used herein, "upstream" and "downstream" refer to relative positions in a printing process. In the context of FIG. 1, for example, master press 102 and slave press 104 first print content onto their respective webs 108, 110, and then feed those webs to finishing unit 106. Hence, finishing unit 106 is "downstream" of presses 102, 104, and presses 102, 104 are "upstream" of finishing unit 106. Finishing unit 106 may perform a variety of different operations on webs 108, 110, including but not limited to folding, cutting, gluing, assembling, etc.

Any one of master press 102, slave press 104, and/or finishing unit 106 may include circuitry 105 that is to practice selected aspects of the present disclosure. Master press 102 and/or slave press 104 may also include a positional (e.g., rotary) encoder 124. Additionally or alternatively, in some examples, a standalone speed matching device that ensures webs 108, 110 are printed at the same velocity may include circuitry 105 to perform selected aspects of the present disclosure. In some examples, finishing unit 106 may act as a speed matching device.

Circuitry 105 may take various forms, including but not limited to an application-specific integrated circuit ("ASIC") and/or a field-programmable gate array ("FPGA"). In some examples, and as shown in FIG. 1, circuitry 105 may take the form of a processor 109 and computer-readable memory ("CRM") 107 that stores instructions 302-310 to perform aspect(s) of method 300 of FIG. 3, described below. Also depicted in FIG. 1 is a press interface adaptor ("PIA") 107 that distributes images to the various presses 102, 104. These images may be obtained by PIA 107 from various sources, such as a remote computing device (not depicted) operated by a user who wishes to control presses 102, 104 and/or finishing unit 106 to print and/or generate a printed product 112.

In various examples, content in a frame printed by master press 102 may be combined with content printed in a corresponding frame printed by slave press 104. For example, master press 102 may print a first frame that contains a first document addressed to a particular person, such as a credit card statement, custom catalog, bulk mailing, etc. Slave press 104 may print a second frame that contains a second document that is meant to accompany first product, e.g., as part of a combined product. Finishing unit 106 may combine these documents as desired, e.g., by folding, gluing, arranging, cutting, etc., to form a combined product 112.

It may be desired that the first and second frames from the master and slave printing presses 102, 104, respectively, arrive at finishing unit 106 at the same time. Otherwise, finishing unit 106 may combine a portion of one web 108 with a portion of the other web 110 such that one or both portions are not aligned with a printed frame, which may result in a defective product. Even if first web 108 and second web 110 are driven at the same velocity, there may be various reasons that related pairs of frames on the respective webs 108, 110 may not arrive at finishing unit 106 at the same time. As noted previously, a paper encoder integral with master press 102 and/or slave press 104 may not be perfectly calibrated with a paper encoder of the other press. Additionally or alternatively, and as shown in FIG. 1, master press 102 and slave press 104 may not be the same distance from finishing unit 106.

Accordingly, master press 102, slave press 104, and/or finishing unit 106 may be equipped with various features that enable to-be-combined content printed on webs 108 and 110 to arrive at finishing unit 106 at the same time. For example, a master drive control reference 114 may be provided from finishing unit 106 to master press 102. Similarly, a slave drive control reference 116 may be provided from finishing unit 106 slave press 104. These references 114, 116, as well as other communication pathways in FIG. 1 (e.g., 118), may be implemented using various types of wired and/or wireless communication pathways, including but not limited to a process field bus ("PROFIBUS"), serial, universal serial bus ("USB"), Ethernet, any one of the Institute of Electrical and Electronics Engineers ("IEEE") 802.11 family of wireless communication standards, and so forth.

Master drive control reference 114 and slave master control reference 116 may be used, e.g., by finishing unit 106, to communicate various information about respective velocities of webs 108, 110 as they arrive at finishing unit 106. For example, finishing unit 106 may transmit a command or other data that indicates, to one of master press 102 and slave press 104, that it needs to increase or decrease its respective web feed velocity, e.g., to match its web feed velocity to that of the other of master press 102 and slave press 104.

Additionally or alternatively, in some examples, a synchronization signal 118 may be provided from master press 102 to slave press 104. Synchronization signal 118 may be implemented using any one of the previously-mentioned wired or wireless technologies. In various examples, synchronization signal 118 may indicate a moment in time at which master press 102 begins printing a particular frame on first web 108. This particular point in time may be used by slave press 104 to determine when it should start printing its own corresponding frame (i.e. content that is to be combined with the particular frame printed by master press 102). In some examples, synchronization signal 118 may also indicate a feed velocity of master press 102, e.g., which may be matched by slave press 104.

In some examples, the point in time at which master press 102 begins printing its respective frame may be identified in the signal by way of data encoded in the signal that indicates, for instance, a projected future point in time at which master press 102 will begin printing its respective frame. Alternatively, in some examples, the signal may be temporally synchronized with master press 102 beginning to print the frame. In other words, the signal 118 coincides temporally with the point in time at which master press 102 begins printing its respective frame.

If master press 102 and slave press 104 were equidistant from finishing unit 106, if their paper encoders were perfectly calibrated, and if they were operated at the same velocities, then in some cases, slave press 104 may begin printing its respective frame of content at the same time as master press 102 begins printing its respective frame of content. However, as shown in FIG. 1, master press 102 is farther away from finishing unit 106 than slave press 104.

Accordingly, in various examples, a point in time at which slave press 104 should begin printing its respective frame may be determined—e.g., by circuitry 105 integral with slave press 104, master press 102, finishing unit 106, and/or elsewhere (not depicted)—based on synchronization signal 118 received from master press 102 and a first distance between the slave press and a downstream location at which the first and second webs converge, e.g., at finishing unit 106. In some such examples, this determination may be further based on a second distance between master press 102 and the downstream location (e.g., 106). For example, the determination may be based on a difference between the first and second distances.

FIGS. 2A-E demonstrate schematically one example of how operation of master press 102 and slave press 104 may by synchronized, in accordance with various examples. In FIGS. 2A-E, master press 102 is a distance $X_M$ from finishing unit 106. Slave press 104 is a distance $X_S$ from finishing unit 106. Slave press 104 is closer to finishing unit 106—and more particularly, a web convergence point of the finishing unit—than master press 102. Consequently, distance $X_M$ is greater than distance $X_S$. A difference $\Delta_{MS}$ between distances $X_M$ and $X_S$ is also depicted.

Also shown in FIGS. 2A-E is a positional encoder 224 that generates a signal indicative of a length of a web 110 fed by slave press 104, and circuitry 105 that is to perform selected aspects of the present disclosure. In the examples of FIGS. 2A-E, circuitry 105 is shown as integral with slave press 104, but this is not meant to be limiting. In various examples, selected aspects of the present disclosure may be implemented, in whole or in part, elsewhere than slave press 104, such as in master press 102, finishing unit 106, etc.

Master press 102 and slave press 104 are depicted as being different sizes in order to fit onto the page; this should not be construed as limiting, and the presses 102, 104 may be the same size as each other or different sizes from each other. Master press 102 feeds its respective web 108 towards finishing unit 106 at a master velocity $V_M$. Likewise, slave press 104 feeds its respective web towards finishing unit 106 at a slave velocity $V_S$. While $V_M$ and $V_S$ may be the same, it is possible and even likely that encoders on presses 102, 104 are not perfectly calibrated to each other. Accordingly, techniques described herein may facilitate a reset between each printed frame to prevent any error between the encoders growing over time.

Figure 2A:
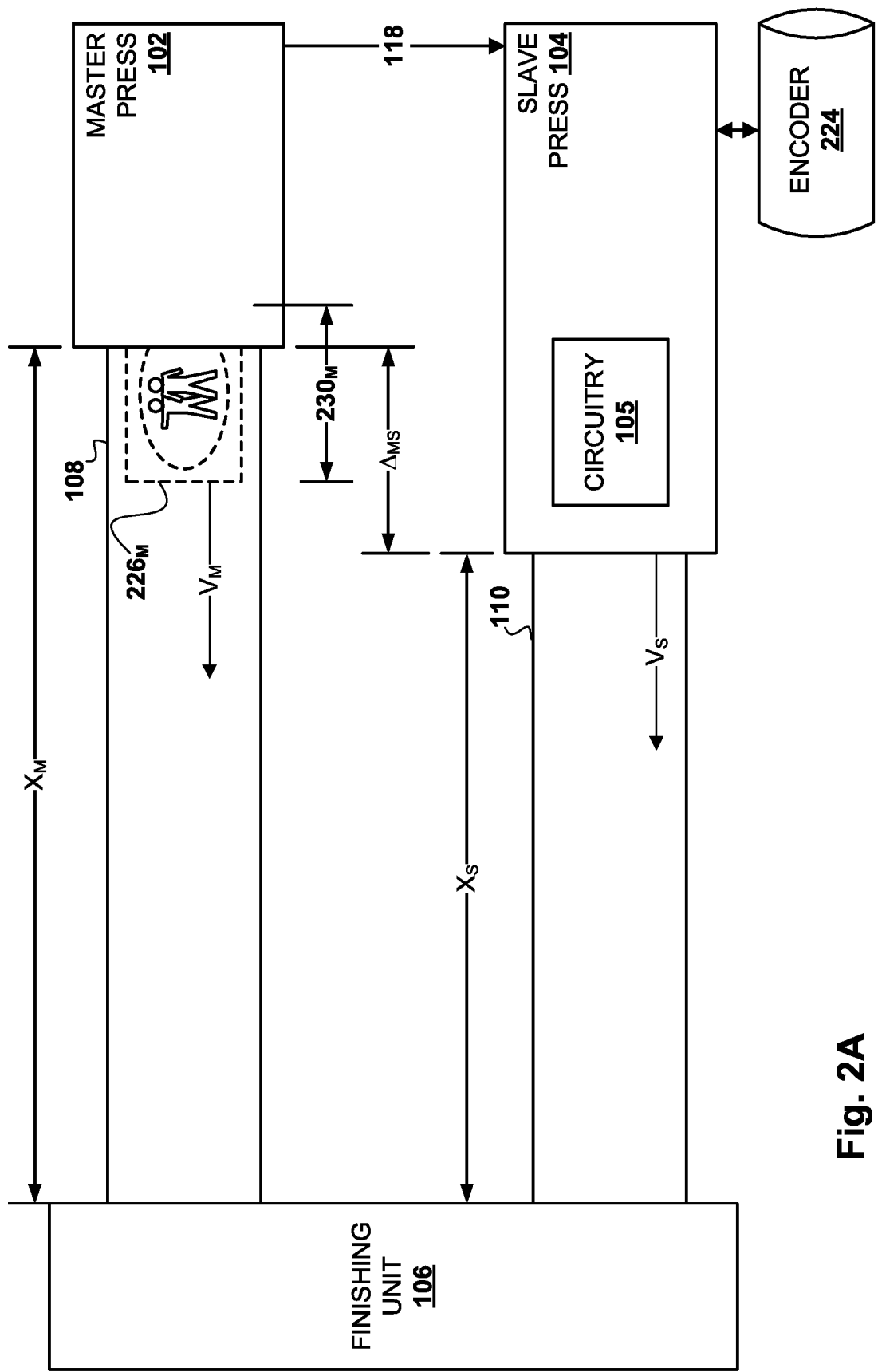
FIG. 2A schematically depicts an example scenario in which various components configured with selected aspects of the present disclosure are operated.

In FIG. 2A, master press 102 has begun printing a first master frame $230_M$ of content onto web 108. Master press 102 also transmitted a synchronization signal 118 to slave press 104 that, for instance, indicates a moment at which master press 102 began printing first master frame $230_M$ of content onto web 108. For example, master press 102 may send signal 118 at the moment it begins printing first master frame $230_M$, e.g., when a leading edge $226_M$ of first master frame $230_M$ is printed.

Figure 2B:
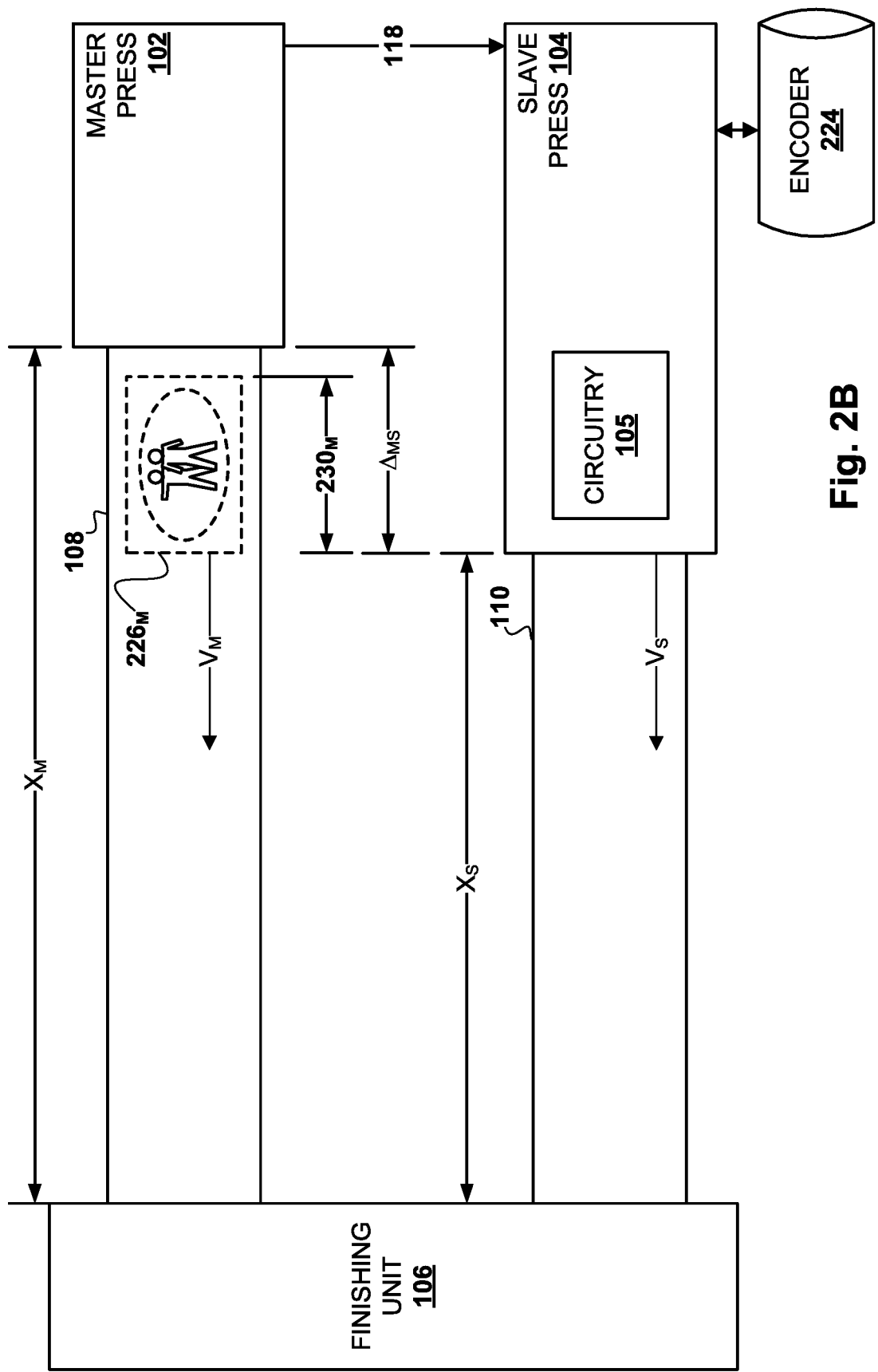
FIG. 2B schematically depicts the example scenario of FIG. 2A at a later time.

As noted previously, slave press 104 is closer to finishing unit 106 than master press 102. Accordingly, slave press 104 may wait to begin printing its own frame of content that is meant for combination with the content of first master frame $230_M$. FIG. 2B shows the moment at which slave press 104 will begin printing its own first slave frame ($230_S$ in FIGS. 2C-D) intended for combination with first master frame $230_M$. This determination may be made, for instance, based on a signal from encoder 224 that indicates web 110 has been advanced by slave press 104 a distance of $\Delta_{MS}$. At this moment, leading edge $226_M$ of first master frame $230_M$ and slave press 104 are equidistant from finishing unit 106. Put another way, FIG. 2B depicts the moment at which master press 102 has printed and advanced web 108 by a distance of $\Delta_{MS}$.

Figure 2C:
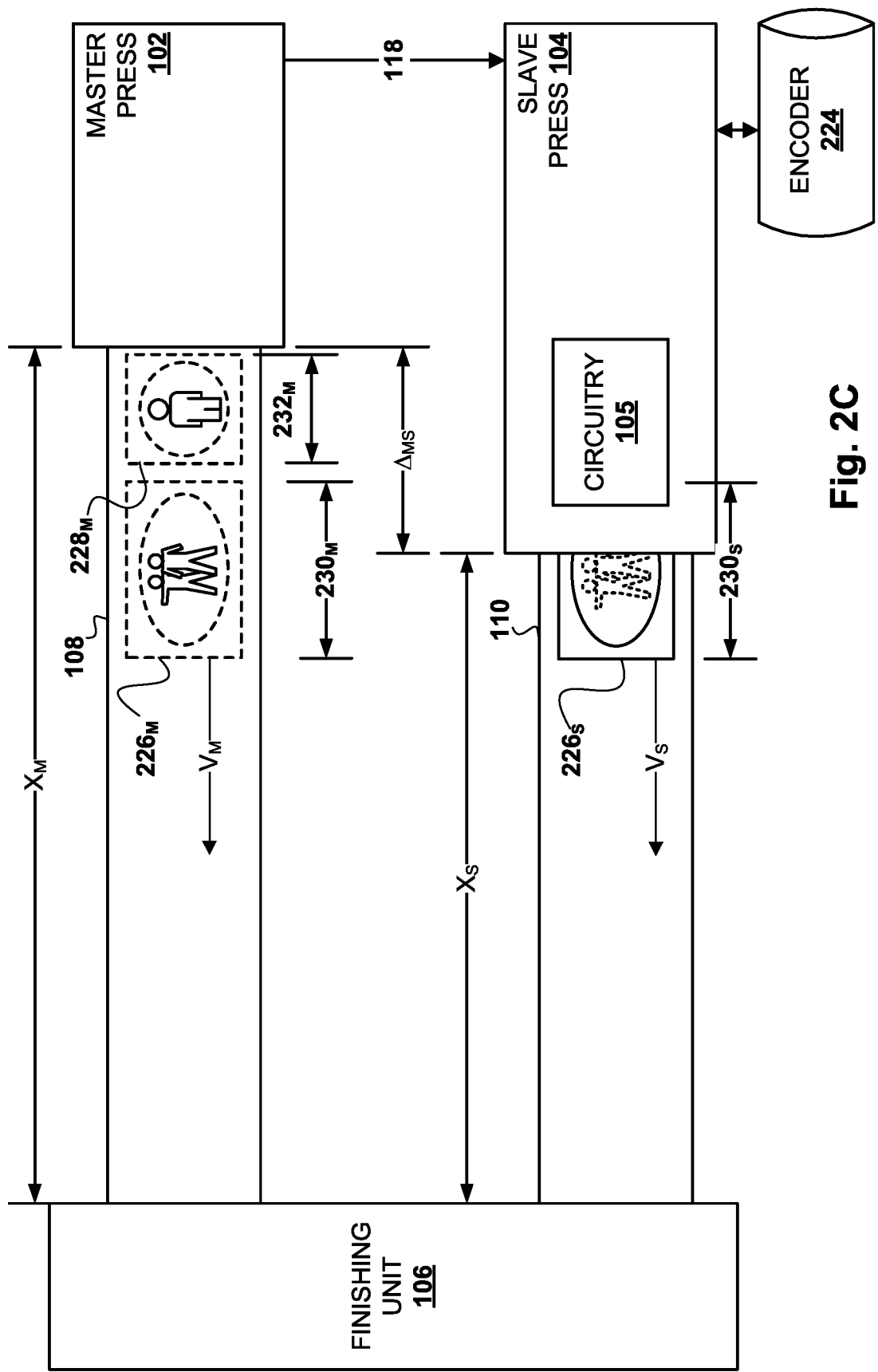
FIG. 2C schematically depicts the example scenario of FIGS. 2A-B at a later time.

FIG. 2C depicts a moment shortly after FIG. 2B. In FIG. 2C, slave press 104 has begun printing its own first slave frame $230_S$ that corresponds to first master frame $230_M$ printed by master press 102. As mentioned previously, the goal is to have first frames $230_M$ and $230_S$ arrive at finishing unit 106 at the same time, e.g., so that finishing unit 106 can performing finishing operation(s) to generate a final product. For example, a leading edge $226_S$ of first slave frame $230_S$ may be aligned with leading edge $226_M$ of first master frame $230_M$ relative to finishing unit 106, e.g., such that leading edges $226_M$, $226_S$ are equidistant from finishing unit 106 as they travel.

In this example, first master frame $230_M$ depicts a pair of people. First slave frame $230_S$ depicts a border that will surround the pair of people when first master frame $230_M$ and first slave frame $230_S$ are combined into a product by finishing unit 106. In various examples, one or both of the pair of people and/or the border may be customized, e.g., to a particular person or entity such as a business or organization. This is demonstrated in FIG. 2C where the dashed border drawn on first master frame $230_M$ represents where the border will appear relative to the pair of people in a finished product (see 205 in FIG. 2E). Likewise, the dashed pair of people drawn on first slave frame $230_S$ represents where the pair of people will appear relative to the border in the finished product.

Also visible in FIG. 2C is a second master frame $232_M$ that has been printed onto web 108 by master press 102. Second master frame $232_M$ includes different content than first master frame $230_M$, in this example, an image of a single person. However, a leading edge $228_M$ of second master frame $232_M$ has not yet been fed the distance $\Delta_{MS}$ from master press 102. Consequently, slave press 104 has not yet begun printing its own second slave frame ($232_S$ in FIG. 2D). As shown in FIG. 2C, different frames printed by the presses 102, 104 may have different longitudinal lengths, e.g., because one or both of presses 102, 104 may be a digital printing press.

Figure 2D:
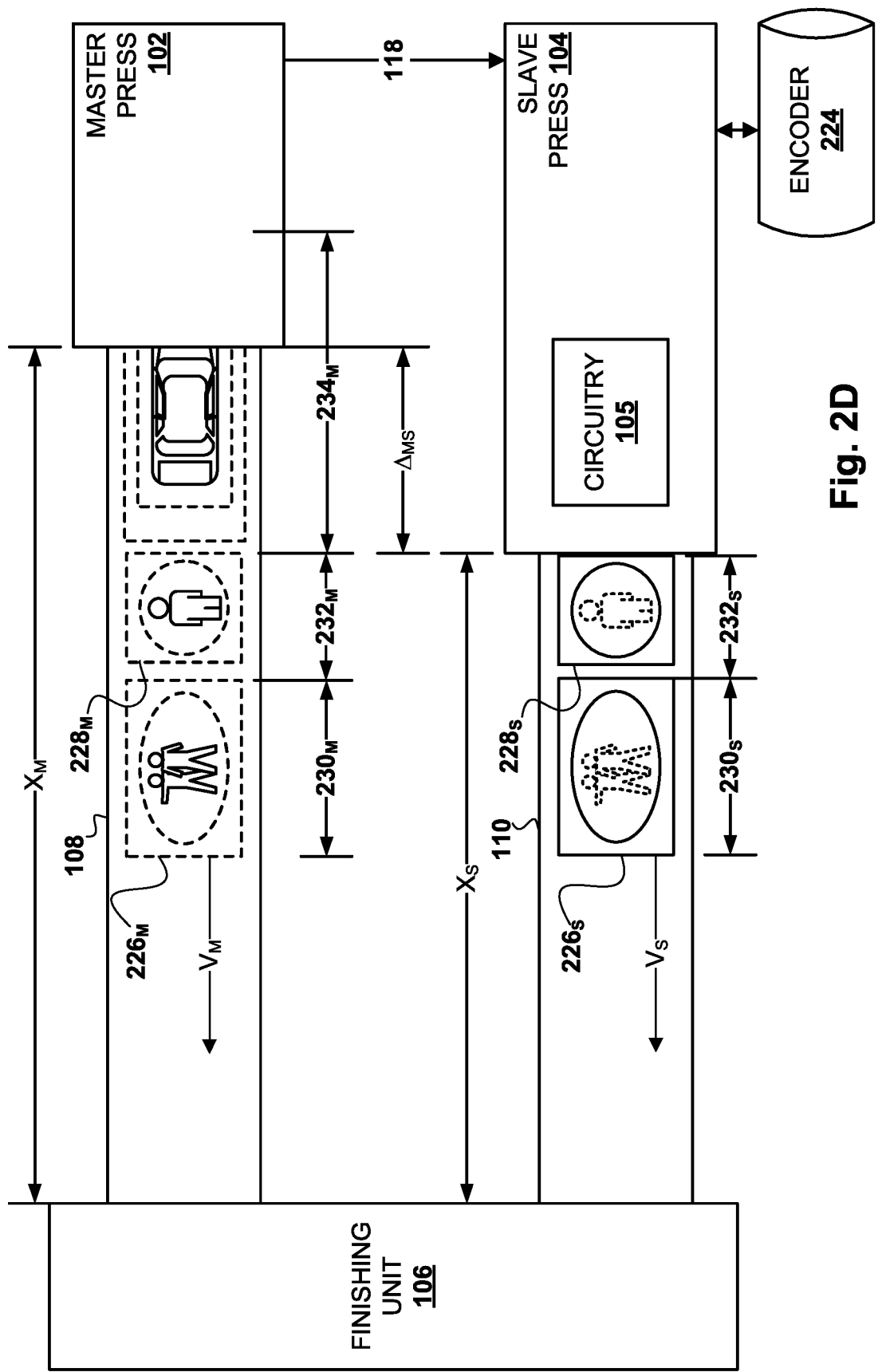
FIG. 2D schematically depicts the example scenario of FIGS. 2A-C at a later time.

FIG. 2D depicts the same scenario moments after FIG. 2C. Slave press 104 has now printed its second slave frame $232_S$ that corresponds to second master frame $232_M$. A leading edge $228_S$ of second slave frame $232_S$ is aligned with a leading edge $228_M$ of second master frame $232_M$ relative to finishing unit 106. Moreover, leading edge $226_M$ of first master frame $230_M$ and leading edge $226_S$ of first slave frame $230_S$ have advanced farther towards finishing unit 106, and remain in alignment with each other relative to finishing unit 106. A third master frame $234_M$ that includes an overhead view of a vehicle is also visible being printed by master press 102.

Figure 2E:
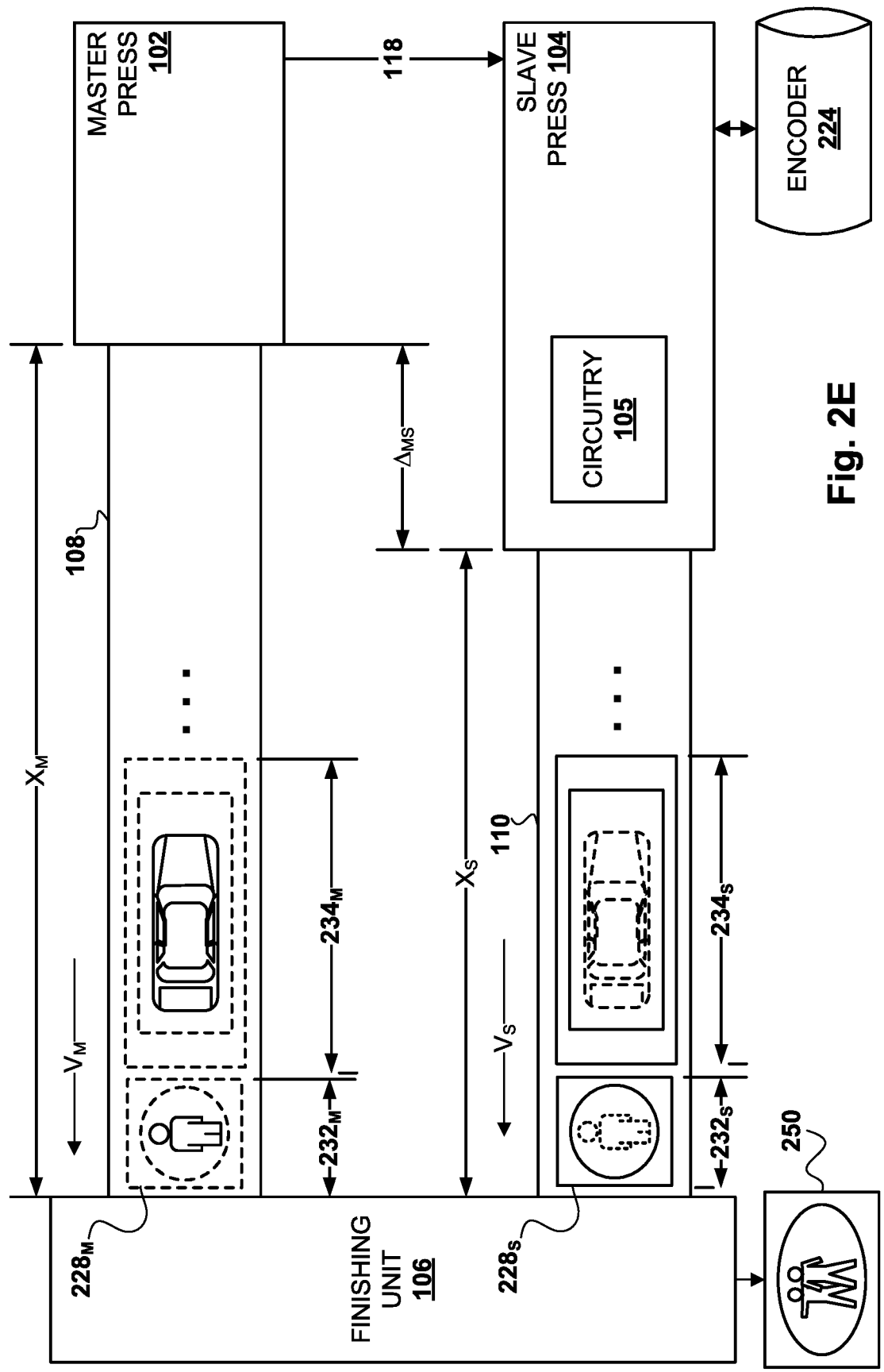
FIG. 2E schematically depicts the example scenario of FIGS. 2A-D at a later time.

FIG. 2E depicts the same scenario some time later, e.g., after a first product 250 has been generated by finishing unit 106 using first master frame $230_M$ and first slave frame $230_S$. Webs 108 and 110 have continued to be fed towards finishing unit 106 so that second master frame $232_M$ and second slave frame $232_S$, as well as third master frame $234_M$ and a corresponding third slave frame $234_S$, are closer to finishing unit 106. As indicated by the ellipses following third frames $234_M$, $234_S$, any number of additional frames of content may be printed on webs 108, 110.

Figure 3:
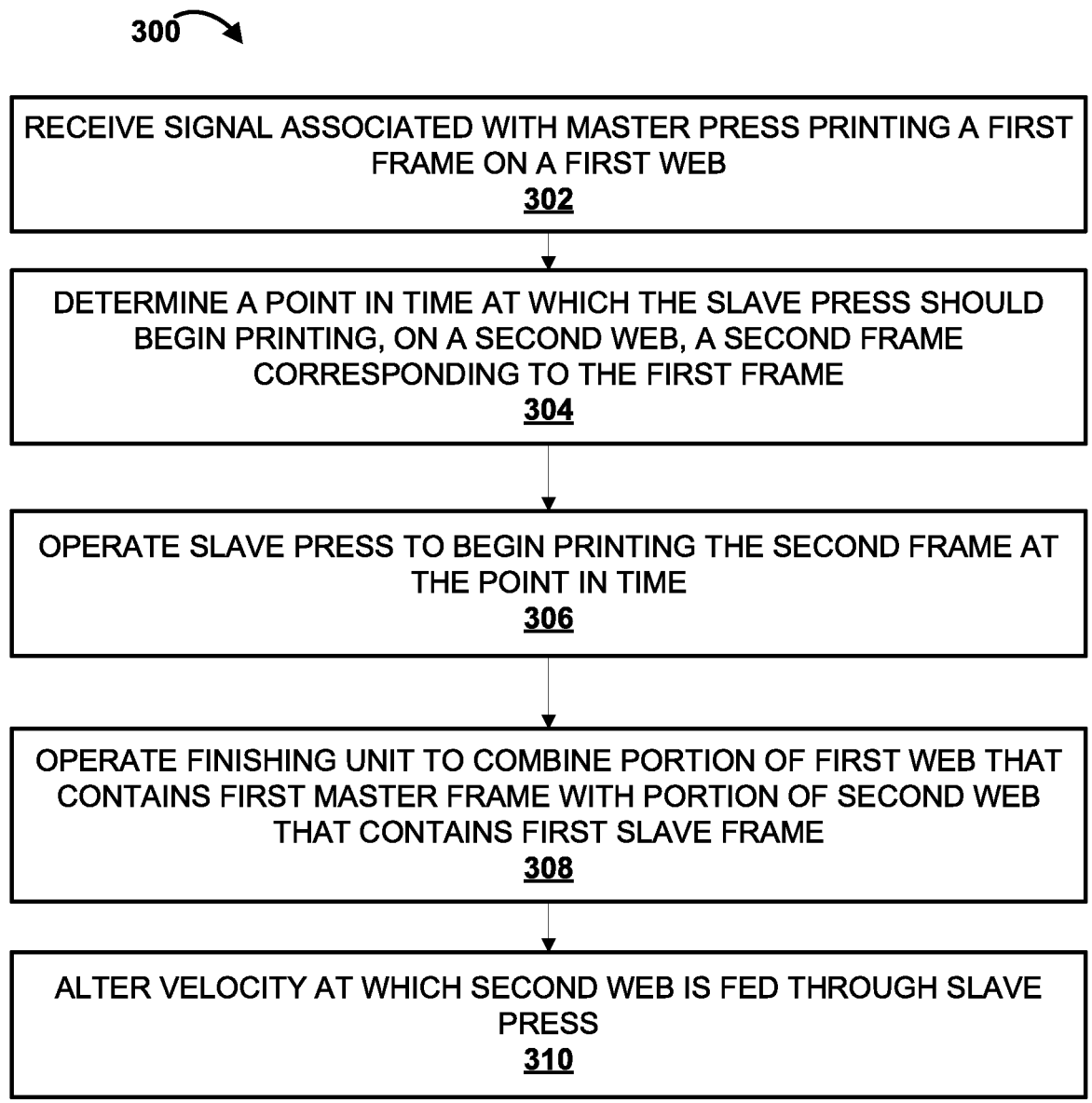
FIG. 3 depicts an example method of practicing selected aspects of the present disclosure.

FIG. 3 depicts an example computer-implemented method 300 of practicing selected aspects of the present disclosure. For convenience, operations of method 300 will be described as being performed by circuitry configured with selected aspects of the present disclosure, such as circuitry 105, as was depicted in FIG. 1. The operations in FIG. 3 are not meant to be limiting; various operations may be added, omitted, and/or reordered.

At block 302, the circuitry may receive a signal associated with master press 102 printing a first frame (e.g., $230_M$) on first web 108. For example, the signal may coincide temporally with master press 102 beginning to print leading edge $226_M$ of first master frame $230_M$. Alternatively, the signal may encode a projected future time, or time interval until that future time, at which master press 102 will begin printing the first master frame. The latter may be true, for instance, in examples in which master press 102 is closer to a downstream convergence point, such as finishing unit 106, than slave press 104.

At block 304, the circuitry may determine a point in time at which the slave press should begin printing, on a second web, a second frame corresponding to the first frame. In various examples, the determining of block 304 may be based on the signal associated with the master press and a first distance ($X_S$ in FIGS. 2A-E) between slave press 104 and the downstream location at which the first and second webs 108, 110 converge, such as finishing unit 106. In some examples, the determination of block 304 may be further based on a second distance ($X_M$ in FIGS. 2A-E) between master press 102 and finishing unit 106. For example, the difference $\Delta_{MS}$ between $X_S$ and $X_M$ may be used to determine when slave press 104 should begin printing its respective frame of content.

At block 306, the circuitry may operate slave press 104 to begin printing the second frame at the point in time determined at block 304. Thus, for instance, slave press 104 in FIGS. 2A-D begins printing first slave frame $232_S$ at the moment in time depicted in FIG. 2B at which leading edge $226_M$ of first master frame a distance $X_S$ from finishing unit 106. Put another way, the point in time may be determined based on a paper encoder signal generated by positional encoder 224 of slave press 104, e.g., by determining that web 110 has advanced by a distance of $\Delta_{MS}$.

At block 308, the circuitry may operate finishing unit 106 to combine a portion of first web 108 that contains the first master frame (e.g., $230_M$) with a portion of second web 110 that contains the first slave frame (e.g., $230_S$). For example, these portions may be folded, cut, or otherwise altered and/or combined with each other, e.g., in an envelope provided by a separate component, or with one portion being used as an envelope of the other portion, etc.

Although the feed velocities ($V_M$ and $V_S$) across master press 102 and slave press 104 may be intended to be identical, they may diverge slightly for any number of mechanical and/or electrical reasons. Accordingly, in some implementations, a velocity at which one or both of master press 102 and/or slave press operate may be altered, e.g., by the circuitry. For example, at block 310, the circuitry may alter a velocity $V_S$ at which second web 110 is fed through slave press 104. This alteration may be based on, for instance, master drive control reference 114 and/or slave drive control reference 116 in FIG. 1.

In addition to method 300, some examples include a processor (e.g., 109 in FIG. 1), e.g., a central processing unit (CPU) and/or a graphics processing unit (GPU) of one or more computing devices. The processor is operable to execute instructions stored in associated memory (e.g., 107 in FIG. 1). The instructions, when executed by the processor, cause performance of aspect(s) of method 300. Some examples also include transitory and/or non-transitory computer readable storage media storing computer instructions executable by the processor to perform aspect(s) of method 300.

Examples described herein have related primarily to scenarios in which master press 102 is farther away from finishing unit 106 (or more generally, a downstream convergence point) than slave press 104. However, this is not meant to be limiting. In various examples, master press 102 may in fact be closer to finishing unit 106 than slave press 104. In some such examples, slave press 104 may be given advanced notice of when it should begin printing a slave frame, e.g., a projected point in time that will occur before master press 102 begins printing its own corresponding master frame. Moreover, while examples described herein have included a single master press and a single slave press, this is not meant to be limiting. In various examples, a single master press may be operated in tandem with multiple slave presses, with all the presses feeding their respective webs to a shared downstream convergence point.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What is claimed is:

1. A computer-implemented method for synchronizing a master press and a slave press, the method comprising:
    receiving a signal associated with the master press printing a first frame on a first web;
    determining a point in time at which the slave press should begin printing, on a second web, a second frame corresponding to the first frame, wherein the determining is based on the signal associated with the master press and a first distance between the slave press and a downstream location at which the first and second webs converge; and
    operating the slave press to begin printing the second frame at the point in time so that the first frame and the second frame are to arrive at the downstream location at a substantially same time while the slave press is positioned in parallel with respect to the master press.

2. The computer-implemented method of claim 1, the determining is based on a second distance between the master press and the downstream location.

3. The computer-implemented method of claim 2, wherein the determining is based on a difference between the first distance and the second distance.

4. The computer-implemented method of claim 1, wherein the downstream location comprises a finishing unit, and the method further includes operating the finishing unit to combine a portion of the first web that contains the first frame and a portion of the second web that contains the second frame into a combined product.

5. The computer-implemented method of claim 1, wherein the first frame is different than other frames printed on the first web by the master press.

6. The computer-implemented method of claim 1, wherein the second frame is different than other frames printed on the second web by the slave press.

7. The computer-implemented method of claim 1, wherein the point in time comprises a first point in time, the signal identifies a second point in time in which the master press begins printing the first frame on the first web, and the determining is based on the second point in time.

8. The computer-implemented method of claim 1, further comprising altering a velocity at which the second web is fed through the slave press based on the signal.

9. A printing press comprising circuitry to:
    receive a signal from a remote printing press, wherein the signal indicates a first moment in time at which the remote printing press begins printing a first frame on a first web;
    determine a second moment in time at which the printing press will begin printing, on a second web, a second frame intended for combination with the first frame in a product, wherein the determination is based on the first moment in time and a distance between the remote press and a finishing unit at which the first and second webs converge; and
    operate the printing press to begin printing the second frame at the second moment in time so that the first frame and the second frame are to arrive at the finishing unit at a substantially same time while the printing press is positioned in parallel with respect to the remote printing press.

10. The printing press of claim 9, wherein the determination is based on a difference between the distance and another distance between the printing press and the finishing unit.

* * * * *